A. C. LINDGREN.
DRAFT DEVICE FOR PLOWS.
APPLICATION FILED AUG. 23, 1912.
1,181,147.
Patented May 2, 1916.
2 SHEETS—SHEET 1.
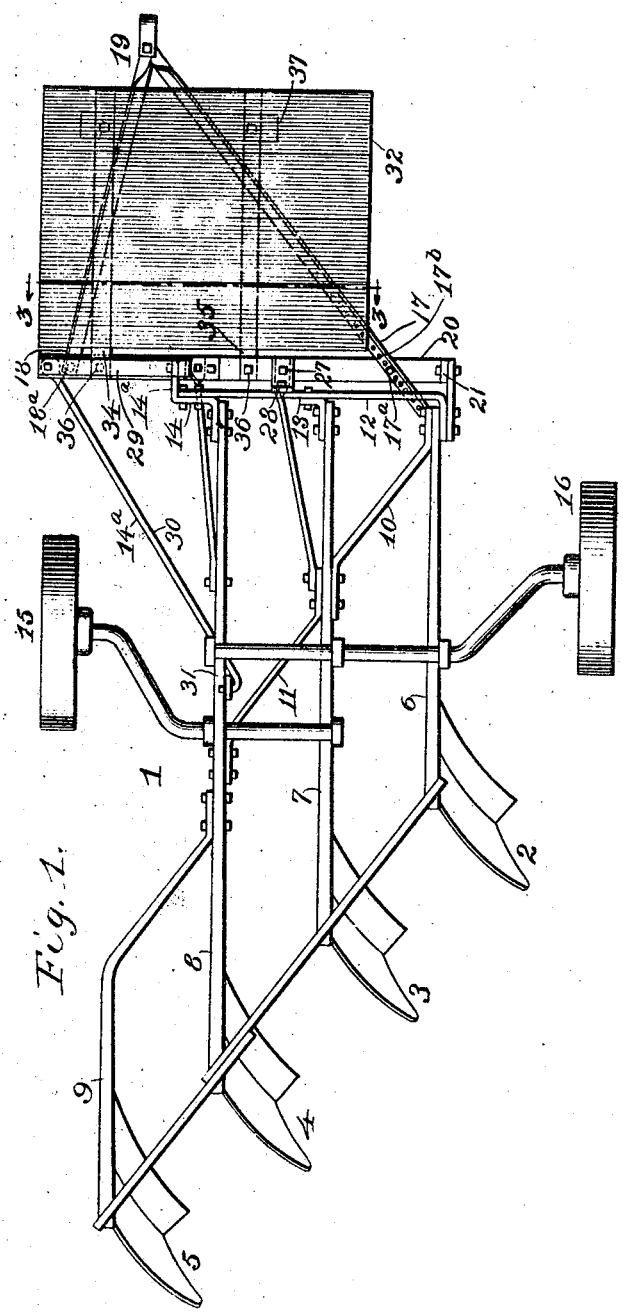
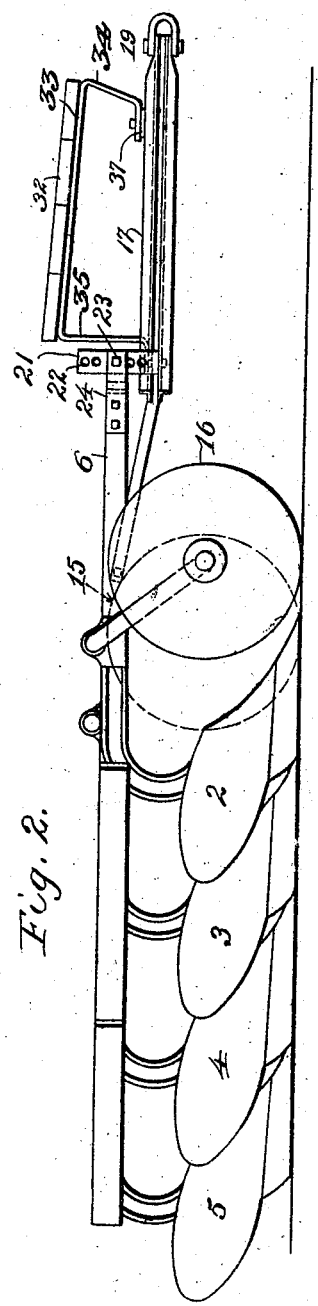

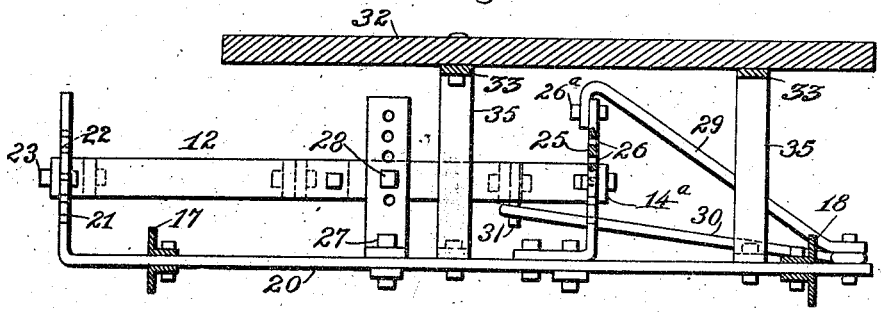
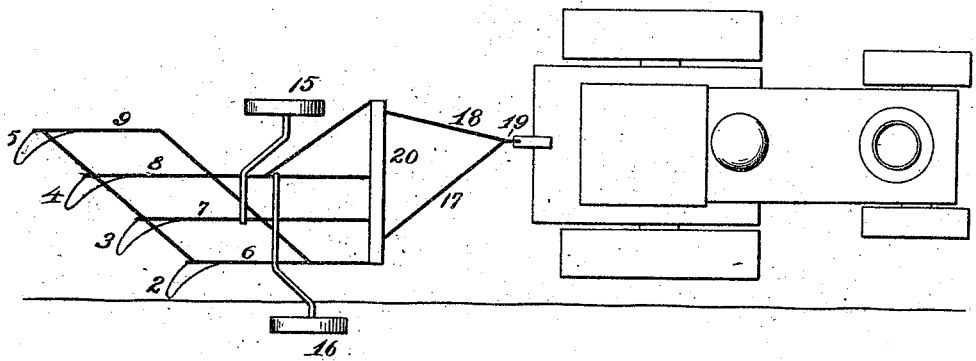

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

DRAFT DEVICE FOR PLOWS.

1,181,147. Specification of Letters Patent. Patented May 2, 1916.

Application filed August 23, 1912. Serial No. 716,573.

*To all whom it may concern:*

Be it known that I, ALEXUS C. LINDGREN, a citizen of the United States, residing at Moline, in the county of Rock Island and State of Illinois, have invented certain new and useful Improvements in Draft Devices for Plows, of which the following is a specification, reference being had therein to the accompanying drawing.

This invention relates to draft devices for plows and has special reference to a draft connection to be used between a tractor and a gang plow for drawing the same over the field.

In the use of traction engines for pulling a three or four plow gang, it has heretofore been very difficult to hitch the plow to the tractor in such manner as to keep the driving wheel of the tractor away from the furrow wall. To do this, it has been the practice to hitch the plow to the righthand side of the tractor, but this has resulted in a side pull on the tractor, rendering it very difficult, if not impossible, to keep away from the furrow. Again, if the hitch usually consisting of a chain were attached to the lefthand side of the plow, the latter would run sidewise, as the usual hitching point on a four plow gang, for instance, is between the second and third beams, constituting the transverse center of the plow.

It is the aim of the present invention to overcome these objections; and my invention consists of a draft device connected with the plow and adapted to be connected with the tractor, and so constructed that the plow will be disposed to the furrow side of the tractor, and will be drawn straight forward by the tractor, and both the tractor, and plow will be free from side strains.

In its more detailed form, the draft connection comprises a stiff draft frame consisting of two draft bars connected at their rear ends to the front of the plow frame at two points separated from each other transversely, and connected at their forward ends together and to the tractor at or about the center of the same and in a longitudinal line disposed landward of the transverse center of the plow, the relative construction and arrangement of the draft connection being such that while the plow will be disposed furrowward of the tractor to enable the tractor to travel on the land, the plow will follow straight in the line of draft.

The invention consists also in combining with a draft device of the construction described, an operator's platform mounted and sustained so as to bridge the space between the plow and tractor.

In the accompanying drawings: Figure 1 is a top plan view of a gang plow provided with my improved draft device. Fig. 2 is a side elevation of the gang plow and draft device. Fig. 3 is a transverse sectional elevation on the line 3—3 of the preceding figure, looking rearward. Fig. 4 is a diagrammatic view showing particularly the furrowward displacement of the plow relative to the tractor and indicating how the latter is enabled to travel on the land without danger of approaching the furrow wall too closely.

Referring to the drawings: 1 represents a plow, in the present instance a gang plow having four moldboard plows 2, 3, 4 and 5, which are sustained by a frame comprising longitudinally extending beams 6, 7 and 8, to which the moldboards 2, 3 and 4 are respectively attached, and a third beam 9 connected with the side of beam 8 and carrying the moldboard 5. These beams are suitably braced by diagonal braces 10 and 11 connecting the beams 6, 7 and 8 together, and at their forward ends the beams are connected together by means of a horizontal transverse strap 12 bolted at one end firmly to the beam 6 and connected by means of a bracket plate 13 to the beam 7, and connected at its opposite end to the forward end of beam 8 by a Z-shaped bracket 14 having a horizontal extension 14ª, the purpose of which will be presently described. As a result of the construction described, an integral plow frame structure is produced which is suitably supported at the landside by a wheel 15, and at the furrowside by a furrow wheel 16, said wheels being mounted on axles sustained by the frame.

My improved draft device comprises two forwardly extending draft bars 17 and 18 which are connected together at their forward ends, as at 19, and which are connected at their rear ends to the plow frame at points separated from each other in a transverse direction, the draft bars thus diverging from their forward ends to the rear, where they are connected with the plow frame. The connection of the rear ends of the bars with the plow frame is preferably effected through the medium of a transverse frame bar 20 extending from the beam 6 at a point in line with the moldboard 2, to a point beyond the beam 8 and terminating in line with the moldboard 5. This frame bar has one end extended vertically, as at 21, which vertical extension is provided with a number of bolt holes 22 to receive the fastening bolt 23 passing through the end of a bracket 24 extending forwardly from the forward end of beam 6. Some distance from its opposite end, the frame bar has fixed to it a vertical bracket plate 25 having a number of bolt holes 26 therein to receive a fastening bolt 26ª passing through the extension 14ª, before alluded to, on the forward end of beam 8; and between these two points of attachment of the frame bar, the latter is provided with a vertical bracket plate 27 having a number of holes to receive a fastening bolt 28 passing through the strap 12, by which means the transverse frame bar is connected with the frame of the plow at its front in such manner that the bar may be adjusted vertically in relation thereto.

The upper end of the bracket plate 25 is braced to the outer end of the frame bar by means of a diagonally extending brace 29 connected at its ends to said parts; and said outer end of the frame bar is also braced to the beam 8 by means of a rearwardly extending brace bar 30 fastened at its forward end between the brace 29 and frame bar and connected at its rear end to a plate 31 fixed to the beam 8. By this means, the transverse frame bar is maintained rigidly in a horizontal position at the front of the plow frame, while being capable of a vertical adjustment in relation thereto.

The draft bars 17 and 18, before alluded to, have their rear ends fastened to the transverse bar, the bar 18 being fastened permanently by means of a fastening bolt 18ª, and the bar 17 being fastened adjustably by means of a bolt 17ª adapted to be passed through any one of a series of holes 17ᵇ in the bar 17. The draft bars 17 and 18, connected and applied as shown, constitute a draft device which when the two bars are adjusted in the relation shown in Fig. 1, is connected at its rear end to the opposite ends of the transverse bar and has its forward end, where the two bars are connected together, and at which point it is adapted to be hitched to the tractor, arranged in a longitudinal line disposed landward of a point midway between the points of attachment of the bars with the frame bar. The draft bars 17 and 18, in connection with the transverse frame bar to which they are connected, constitute in effect a triangular draft frame, the forward end or apex of which is adapted to be connected with the tractor, and which apex is disposed to the landside of a medial point between the points of connection of the rear ends of the draft bars with the transverse frame bar. As a result of this construction and relation of the parts, when the draft device is connected with the tractor at or about the center of the same, that is, at a point midway between the two wheels, as shown more particularly in Fig. 4, the center of the plow will be disposed furrowward of the center of the tractor or displaced to the furrow side of the tractor, and the plow will be drawn straight forward in the line of travel of the tractor and will be free from side strains or draft forces which might tend to pull the tractor toward the furrow or the plow toward the land.

The degree of furrowward displacement of the plow relative to the tractor may be varied to suit the conditions encountered, by varying the point in the length of draft bar 17 where connection is made with the transverse frame bar 20, a change of the fastening bolt 17ª to the forward holes in the bar causing the connected ends of the bars to be shifted toward the furrow side of the plow, and a change of the bolt to the rear holes causing the point to be shifted in the opposite direction, these changes resulting also in the change of the point at which the component of draft forces will act on the plow.

The construction described constitutes a stiff draft connection which when coupled with a tractor will dispose the plow frame a considerable distance from the tractor with the point of hitch to the tractor substantially in line with the front or outermost landside beam in the particular example shown. This will displace the plow a considerable distance furrowward of the tractor, so that in the travel of the parts over the field the tractor will have plenty of room to travel with both wheels on the unplowed ground, and the plow will be drawn straight forward in the line of travel of the tractor.

I propose in connection with the draft device described to employ an operator's platform to bridge the space between the plow and tractor. The platform, indicated by the numeral 32, is fixed to two fore and aft brackets 33, 33, having depending front and rear feet 34 and 35, respectively. The rear feet 35 of the brackets are fixed to and sustained by the frame bar 20 by means of fastening bolts 36, 36, while the front feet 34 of the brackets are connected together by a horizontal transverse bar 37, which rests loosely on and is sustained by the draft bars 17 and 18 near their front. By this means the platform is sustained at its rear by the frame of the plow and at its front by the draft device, the loose support afforded the platform by the draft device as described enabling the draft bars to be adjusted without disturbing the position of the platform.

While in the accompanying drawings I have illustrated and described my improved device in the form which I prefer to adopt, and which in practice has been found to answer to a satisfactory degree the ends to be attained, it will be understood that the details may be variously changed within the skill of the mechanic without departure from the spirit of the invention, and it will be further understood that my invention is not limited to any particular form or construction of the parts except in so far as such limitations are contained in the appended claims.

Having thus described my invention, what I claim is:

1. In combination with a gang plow having a front transverse frame bar, forwardly extending draft bars connected at their rear ends to said frame bar and connected together at their forward ends, the said frame bar and draft bars constituting in effect a rigid, stiff, triangular draft frame, whose apex is disposed landward of a point midway between the points of connection of said draft bars with the transverse bar; whereby when the apex of said draft frame is connected to the center of a tractor, the gang plow will be drawn straight forward in the line of travel without deflection.

2. In combination with a tractor, a gang plow, a transverse frame bar connected with said gang plow, and two forwardly extending draft bars connected at their rear ends with the frame bar and connected together at their forward ends, thereby constituting a stiff, rigid, triangular draft frame, the apex of which is disposed to the landside of a medial point between the points of connection of the draft bars with the transverse bar, and which apex is connected with the tractor at a point, midway or substantially so, between the wheels of the same.

3. In combination with a plow having a front transverse frame bar, forwardly-extending draft bars connected to said frame bar, and a platform sustained at its rear by the transverse frame bar and movably sustained at its front by said draft bars.

4. In combination with a plow having a front transverse frame bar, forwardly-extending draft bars connected to the said transverse bar, fore and aft brackets sustained at their rear ends by the transverse frame bar, a transverse bar connecting the brackets together at their front, and resting on the draft bars, and a platform mounted on the brackets.

5. In combination with a plow, a transverse frame bar connected to the front of the plow and adjustable vertically relatively thereto, forwardly-extending draft bars connected with the frame bar, and a platform sustained by the frame bar at its rear and sustained by the draft bars at its front.

In testimony whereof I affix my signature in presence of two witnesses.

ALEXUS C. LINDGREN.

Witnesses:
 T. C. BLANDING,
 JAMES J. LAMB.